April 23, 1929.  J. L. HILTON  1,710,644
TRESTLE
Filed Jan. 20, 1928
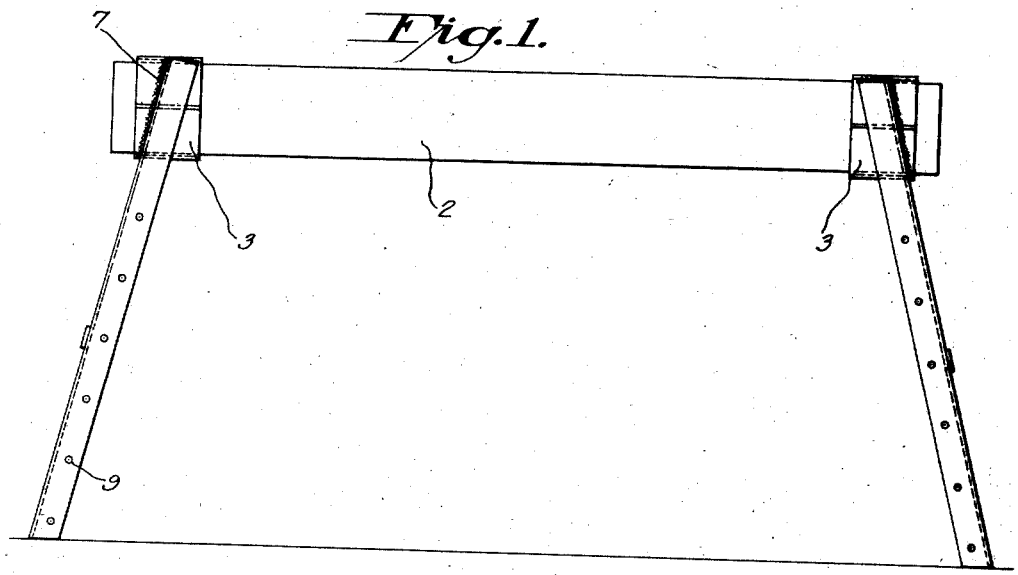
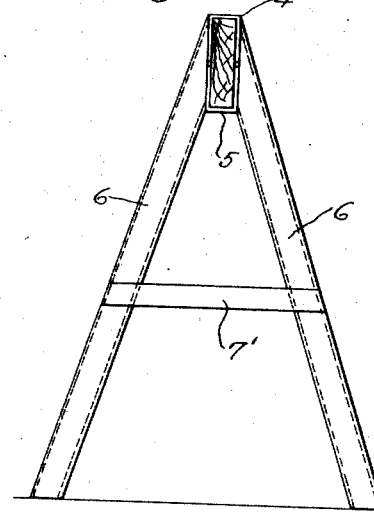
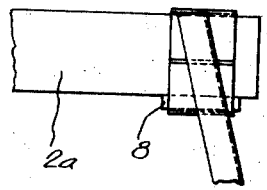
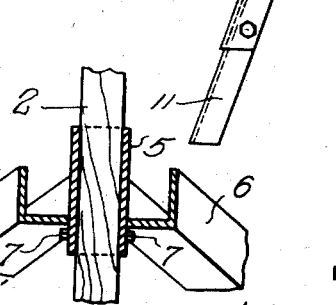
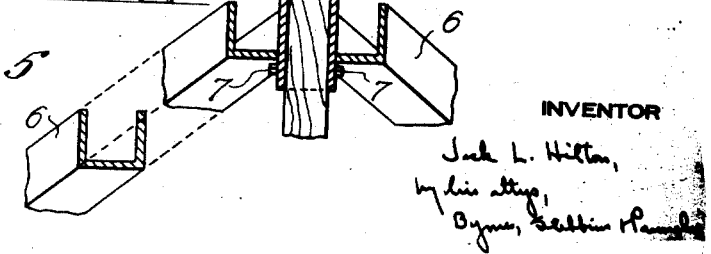
INVENTOR Patented Apr. 23, 1929.

1,710,644

UNITED STATES PATENT OFFICE.

JACK L. HILTON, OF YOUNGSTOWN, OHIO, ASSIGNOR TO THE COMMERCIAL SHEARING & STAMPING COMPANY, OF YOUNGSTOWN, OHIO, A CORPORATION OF OHIO.

TRESTLE.

Application filed January 20, 1928. Serial No. 248,169.

This invention relates to trestles and provides a trestle structure which is very strong and compact and may be readily carried from place to place. It provides more specifically a portable trestle leg adapted to be fitted with a backbone such as a piece of commercial timber. The legs are light in weight and may be made of standard steel shapes. They make it possible to form a trestle of any desired length and with a backbone of substantially any desired depth.

In the preferred form of the invention there is provided a box-like member adapted for the reception of a backbone for the trestle and a pair of diverging legs secured to the box-like member. The box-like member is preferably made of two U-shaped pieces having their open sides facing one another, the legs being secured to the sides of the U-shaped members as by welding. This arrangement is very desirable in manufacture as the depth of the box-like member can be adjusted as desired during manufacture. It is thus possible to make trestle legs with box-like members of different sizes by using the same parts.

In the accompanying drawings, illustrating the present preferred embodiment of my invention, Figure 1 is a side elevation of an assembled trestle employing my improved trestle legs;

Figure 2 is an end elevation;

Figure 3 is a view corresponding to a portion of Figure 1 but showing the use of a backbone of lesser depth;

Figure 4 is a detail view of one of the legs showing the manner of varying the height of the trestle; and Figure 5 is a perspective view of a detail of construction.

The illustrated trestle comprises a backbone 2, which may be made of an ordinary piece of commercial timber, fitting into box-like members 3 at either end. The box-like members comprise an upper U-shaped piece 4 and a lower U-shaped piece 5, these pieces having their open sides facing one another. The trestle legs 6 are welded to the U-shaped pieces 4 and 5, as indicated at 7 in Figure 1. This welding serves to secure the legs to the box-like members and also to hold the pieces 4 and 5 in the desired relationship. This construction is of material value so far as manufacturing is concerned, in that the U-shaped pieces 4 and 5 may be placed a greater or lesser distance apart. For instance, it might be desired to make such trestle legs to accommodate an 8″ backbone and others to accommodate a 6″ backbone. In such instance it would only be necessary to spread the U-shaped members so as to accommodate the 8″ backbone and to weld the legs thereto.

The legs 6 are reinforced by a brace 7′ which is welded to the legs at a point spaced from the box-like member 3.

The trestle legs provide a very flexible piece of equipment as the backbone 2 may be made of any desired length. It is not essential that the backbone be of the same depth as the box-like member for, as shown in Figure 3, a lighter backbone $2^a$ may be employed in connection with a filler block or wedge 8.

The legs 6 are channel-like in cross section and holes 9 are formed in their flanges to receive bolts 10 (Figure 4). The bolts 10 hold leg extensions 11 which may be placed in different positions by reason of the number of holes provided in the legs 6. In this way the height of the trestle can be varied as desired.

As is clearly shown in the drawings, each channel-like leg is beveled at its upper end so that the web and both flanges of the channel bear against and are welded to the box-like member 3. This insures a long weld line and gives an improved construction.

I have illustrated and described a preferred embodiment of the invention, but it will be understood that it is not limited to the form shown as it may be otherwise embodied within the scope of the following claims.

I claim:

1. A trestle structure comprising a pair of U-shaped members one above the other and having their open sides facing one another, and a pair of legs each secured to each of the U-shaped members.

2. A trestle structure comprising a pair of U-shaped members one above the other and having their open sides facing one another and a pair of supporting legs, there being a leg on each side of the U-shaped members, each leg being secured to each of the U-shaped members.

3. A trestle structure comprising a box-like member adapted for the reception of a backbone for the trestle, and a pair of legs welded to the box-like member, each leg being cannel-like in cross-section and having each flange and the web in engagement with the box-like member.

In testimony whereof I have hereunto set my hand.

JACK L. HILTON.